US011635260B2

(12) United States Patent
Yoshida et al.

(10) Patent No.: US 11,635,260 B2
(45) Date of Patent: Apr. 25, 2023

(54) HEAT EXCHANGER AND REPLACEMENT METHOD OF HEAT EXCHANGE CORE

(71) Applicant: MITSUBISHI HEAVY INDUSTRIES, LTD., Tokyo (JP)

(72) Inventors: Keisuke Yoshida, Tokyo (JP); Takeshi Kaneko, Tokyo (JP); Koichi Tanimoto, Tokyo (JP); Hiroyuki Nakaharai, Tokyo (JP); Yoichi Uefuji, Tokyo (JP); Nobuhide Hara, Tokyo (JP); Kenji Kirihara, Yokohama (JP); Masahiko Nagai, Yokohama (JP); Koichiro Iida, Tokyo (JP); Yuta Takahashi, Tokyo (JP); Shunsaku Eguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/575,028

(22) Filed: Jan. 13, 2022

(65) Prior Publication Data

US 2022/0268527 A1 Aug. 25, 2022

(30) Foreign Application Priority Data

Feb. 19, 2021 (JP) .............................. JP2021-024994

(51) Int. Cl.
*F28D 7/16* (2006.01)
*B23P 15/26* (2006.01)

(52) U.S. Cl.
CPC ................ *F28D 7/16* (2013.01); *B23P 15/26* (2013.01)

(58) Field of Classification Search
CPC ........ F28D 7/0008; F28D 7/0025; F28D 7/10; F28D 7/106; F28D 7/12
See application file for complete search history.

(56) References Cited

U.S. PATENT DOCUMENTS

| 164,757 | A | * | 6/1875 | North | F28D 1/0435 165/110 |
| 2,066,480 | A | * | 1/1937 | Mckerrall | F23K 5/20 165/92 |
| 2,541,069 | A | * | 2/1951 | Hughes | B01D 17/005 568/810 |
| 2,578,550 | A | * | 12/1951 | Holm | F28D 7/103 165/184 |
| 2,703,701 | A | * | 3/1955 | Simpelaar | F28D 7/103 165/182 |

(Continued)

FOREIGN PATENT DOCUMENTS

| JP | 2008-286437 | 11/2008 |
| JP | 5797328 | 10/2015 |

*Primary Examiner* — Jason L Vaughan
(74) *Attorney, Agent, or Firm* — Wenderoth, Lind & Ponack, L.L.P.

(57) ABSTRACT

A heat exchanger according to one embodiment includes: a heat exchange core; a shell provided to surround the heat exchange core; and a first partition wall that is provided in a space surrounded by an outer surface of the heat exchange core and an inner surface of the shell, and partitions the space into a first header space communicating with the heat exchange core and a second header space communicating with the heat exchange core. The first header space and the second header space are adjacent to each other, separated by the first partition wall.

17 Claims, 17 Drawing Sheets

(56) References Cited

U.S. PATENT DOCUMENTS

| | | | | |
|---|---|---|---|---|
| 2,898,384 | A * | 8/1959 | Viriot | C07C 17/10 570/255 |
| 3,583,476 | A * | 6/1971 | Woebcke | C10G 9/002 422/198 |
| 4,848,448 | A * | 7/1989 | Kaarre | F28F 9/0219 165/173 |
| 4,949,553 | A * | 8/1990 | Suzuki | B60H 1/025 62/238.7 |
| 5,174,369 | A * | 12/1992 | Glass | F28D 7/103 165/82 |
| 6,220,344 | B1 * | 4/2001 | Beykirch | F28D 7/026 165/169 |
| 10,036,090 | B2 * | 7/2018 | Komori | F28B 9/08 |
| 10,234,209 | B2 * | 3/2019 | Tokuda | F28D 7/0066 |
| 2005/0150640 | A1 * | 7/2005 | Nadig | F28D 7/103 165/141 |
| 2008/0283230 | A1 | 11/2008 | Inatomi et al. | |
| 2009/0008074 | A1 * | 1/2009 | Vamvakitis | F28D 7/0083 165/177 |
| 2015/0053381 | A1 | 2/2015 | Takada et al. | |

* cited by examiner

VIEWED ALONG LINE II-II

VIEWED ALONG LINE A-A

HEAT EXCHANGER AND REPLACEMENT METHOD OF HEAT EXCHANGE CORE

CROSS-REFERENCE TO RELATED APPLICATIONS

This application claims the benefit of priority to Japanese Patent Application Number 2021-024994 filed on Feb. 19, 2021. The entire contents of the above-identified application are hereby incorporated by reference.

TECHNICAL FIELD

The present disclosure relates to a heat exchanger and a replacement method of a heat exchange core.

RELATED ART

For example, a heat exchange element (heat exchange core) for performing heat exchange between two fluids has a plurality of flow path groups that extend along the directions in which the fluids flow. When the two fluids flow through the plurality of flow path groups, heat exchange is performed via a partition wall or the like that separates the two fluids (see JP 5797328 B, for example).

SUMMARY

As described in JP 5797328 B, for example, a heat exchange core having a configuration in which a plurality of flow path layers including a plurality of flow paths are stacked can be made smaller than, for example, a shell and tube type heat exchanger. Therefore, in order to reduce the size of the heat exchanger, it is conceivable to employ a heat exchange core having a configuration as described in JP 5797328 B.

However, when the pressure of the fluid flowing through the heat exchange core is relatively high, a countermeasure is necessary for suppressing damage to the heat exchange core.

In view of the above-described circumstances, an object of at least one embodiment of the present disclosure is to realize a heat exchanger that is relatively compact and that has a relatively high pressure resistance performance.

(1) A heat exchanger according to at least one embodiment of the present disclosure includes: a heat exchange core; a shell provided to surround the heat exchange core; and a first partition wall that is provided in a space surrounded by an outer surface of the heat exchange core and an inner surface of the shell, and partitions the space into a first header space communicating with the heat exchange core and a second header space communicating with the heat exchange core, in which the first header space and the second header space are adjacent to each other, separated by the first partition wall.

(2) A replacement method of a heat exchange core according to at least one embodiment of the present disclosure includes steps of: uncoupling the shell and the heat exchange core of the heat exchanger having the configuration of (1) described above; moving at least the heat exchange core from the shell in an axial direction of the shell to remove the heat exchange core from the shell; moving a new heat exchange core in the axial direction with respect to the shell from which the heat exchange core has been removed, and inserting the new heat exchange core into the shell; and coupling the shell and the new heat exchange core.

According to at least one embodiment of the present disclosure, it is possible to realize a heat exchanger that is relatively compact and that has a relatively high pressure resistance performance.

BRIEF DESCRIPTION OF DRAWINGS

The disclosure will be described with reference to the accompanying drawings, wherein like numbers reference like elements.

DESCRIPTION OF EMBODIMENTS

Figure 1:
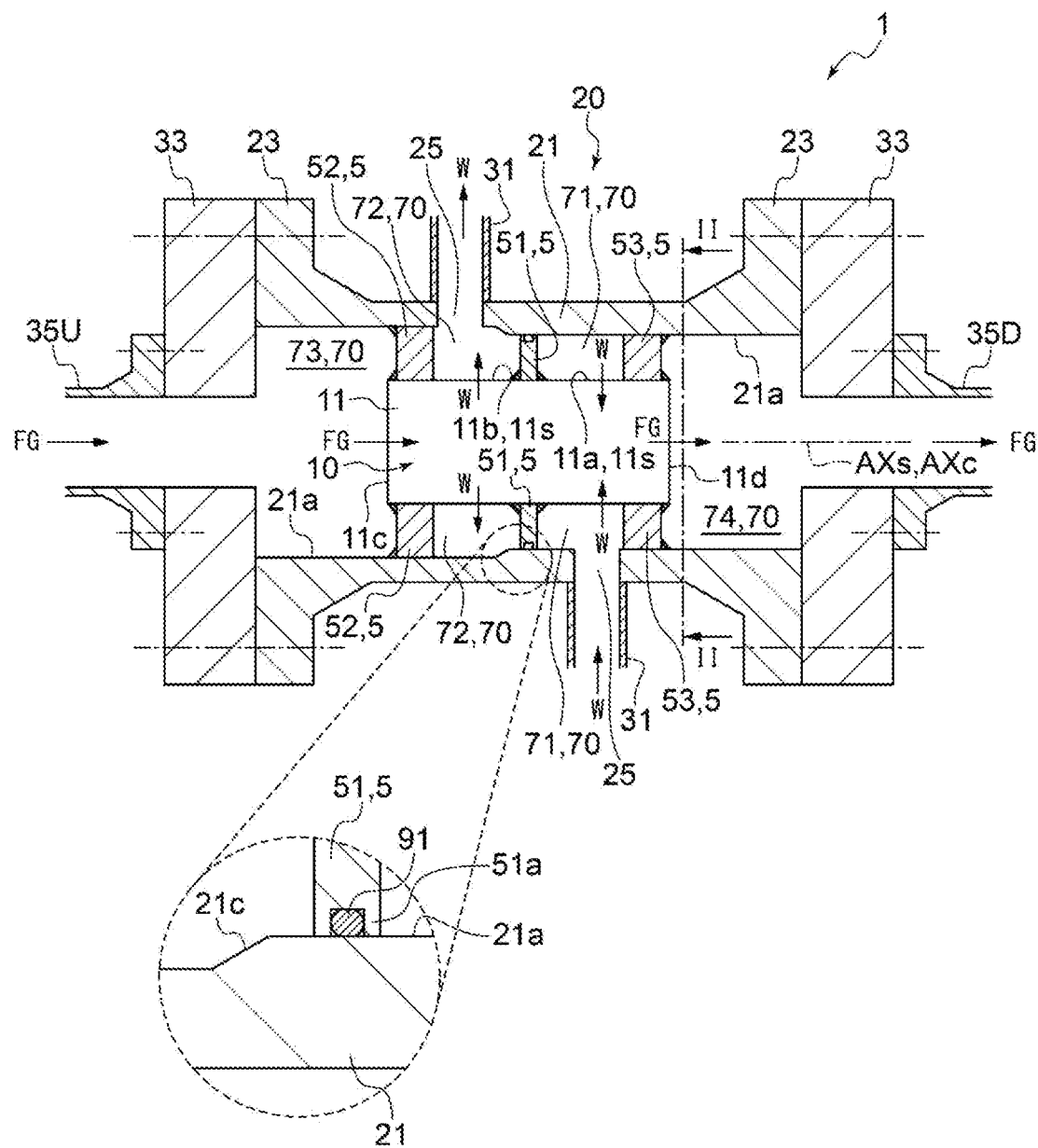
FIG. 1 is a schematic cross-sectional view of a heat exchanger according to one embodiment.

Hereinafter, some embodiments of the present disclosure will be described with reference to the accompanying drawings. However, dimensions, materials, shapes, relative arrangements, or the like of components described in the embodiments or in the drawings are not intended to limit the scope of the present disclosure thereto, and are merely illustrative examples.

For instance, an expression indicating relative or absolute arrangement such as "in a direction", "along a direction", "parallel", "orthogonal", "centered", "concentric" or "coaxial" shall not be construed as indicating only the arrangement in a strict literal sense, but also includes a state where the arrangement is relatively displaced by a tolerance, or by an angle or a distance within a range in which the same function can be achieved.

For instance, an expression indicating an equal state such as "same", "equal", or "uniform" shall not be construed as indicating only a state in which features are strictly equal, but also includes a state in which there is a tolerance or a difference within a range in which the same function can be achieved.

Further, for instance, an expression indicating a shape such as a rectangular shape or a cylindrical shape shall not be construed as only being a geometrically strict shape, but also includes a shape with unevenness, chamfered corners, or the like within a range in which the same effect can be achieved.

On the other hand, an expression such as "comprise", "include", "have", "contain" or "constitute" is not intended to be exclusive of other constituent elements.

FIG. 1 is a schematic cross-sectional view of a heat exchanger according to one embodiment.

Figure 2:
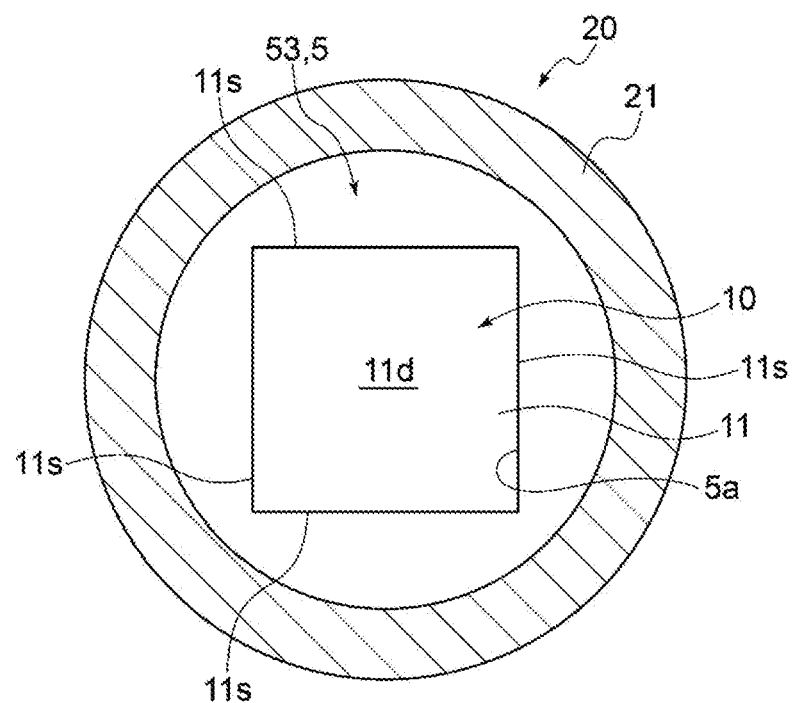
FIG. 2 is a cross-sectional view of FIG. 1 viewed along line II-II.

FIG. 2 is a cross-sectional view of FIG. 1 viewed along line II-II.

Figure 3:
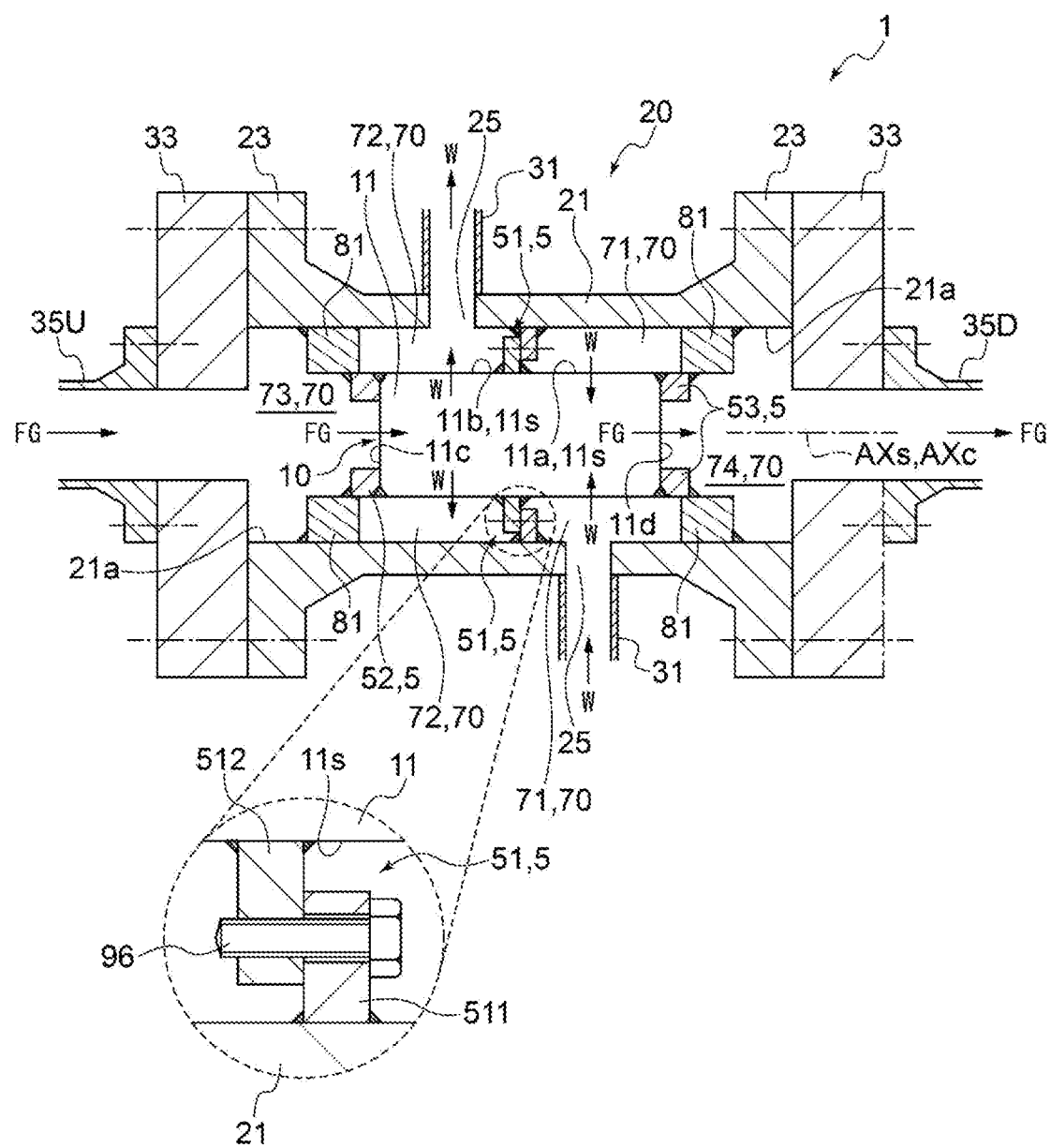
FIG. 3 is a schematic cross-sectional view of a heat exchanger according to another embodiment.

FIG. 3 is a schematic cross-sectional view of a heat exchanger according to another embodiment.

Figure 4:
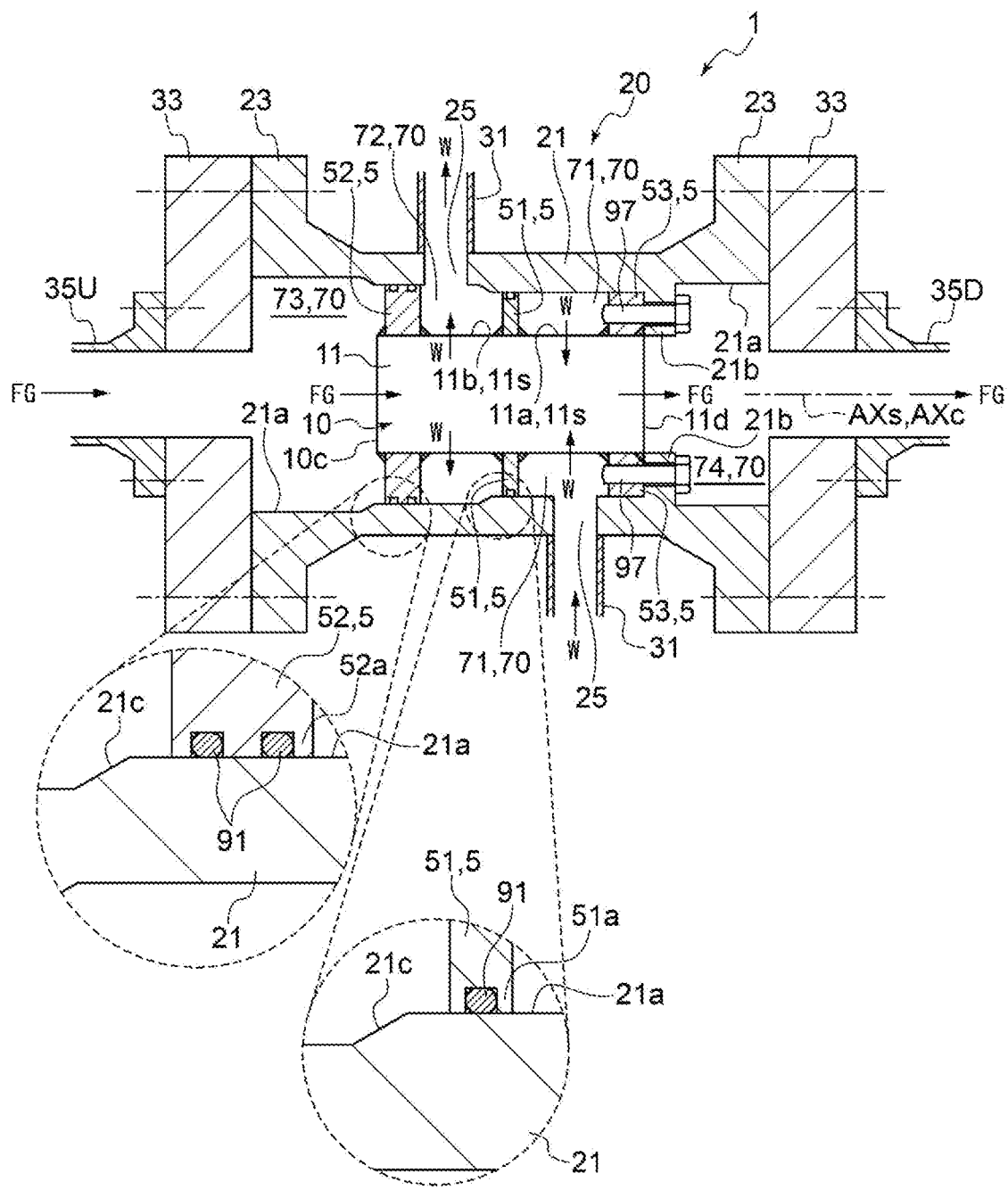
FIG. 4 is a schematic cross-sectional view of a heat exchanger according to yet another embodiment.

FIG. 4 is a schematic cross-sectional view of a heat exchanger according to yet another embodiment.

A heat exchanger 1 according to a few embodiments is for performing heat exchange between a first fluid and a second fluid. The heat exchanger 1 according to a few embodiments can be used for heat exchange between, for example, a fuel gas FG having a relatively low temperature and water W having a relatively high temperature.

The heat exchanger 1 according to a few embodiments can be used for raising the temperature of the fuel gas used as fuel in a gas turbine or the like, for example.

Note that for convenience of description, in the following description, it is assumed that the first fluid is the water W and the second fluid is the fuel gas FG.

The heat exchanger 1 according to a few embodiments includes a heat exchange core 10 and a shell 20 provided to surround the heat exchange core 10.

In the heat exchanger 1 according to a few embodiments, the shell 20 includes a cylinder portion 21 having a cylindrical shape that can withstand a relatively high internal pressure and functioning as a pressure container, and a flange portion 23 formed at one end portion and the other end portion along an axis AXs.

In the shell 20 according to a few embodiments, the cylinder portion 21 has two communicating holes 25 that communicate with the inside and outside of the cylinder portion 21. Short tubes 31 are respectively connected to the two communicating holes 25 from the outside of the cylinder portion 21. Note that a flange portion is formed also on the end portions of the short tubes 31.

In the heat exchanger 1 according to a few embodiments, the shell 20 holds the heat exchange core 10 inside the cylinder portion 21. Specifically, the shell 20 holds the heat exchange core 10 via ribs 5 that directly or indirectly hold the heat exchange core 10.

The structure for holding the heat exchange core 10 via the ribs 5 will be described in detail later.

In the heat exchanger 1 according to a few embodiments, the heat exchange core 10 has, inside a core case 11 having, for example, a quadrangular prism shape, a plurality of first flow paths (not illustrated) and a plurality of second flow paths (not illustrated) that are not in communication with the first flow paths. The heat exchange core 10 according to a few embodiments is configured so as to perform heat exchange between a fluid flowing in the first flow path and a fluid flowing in the second flow path.

Note that the core case 11 may have a cylindrical shape, or may have a polygonal prism shape other than a quadrangular prism.

In the heat exchange core 10 according to a few embodiments, a communicating hole (not illustrated) communicating with one end of each of the plurality of first flow paths (not illustrated) and a communicating hole (not illustrated) communicating with the other end are formed in a peripheral surface 11s of the core case 11 having a quadrangular prism shape. Note that the communicating hole communicating with one end of each of the plurality of first flow paths is provided in a region 11a on one side along an axis AXc of the quadrangular prism shape of the peripheral surface 11s of the core case 11. The communicating hole communicating with the other end of each of the plurality of first flow paths is provided in a region 11b on the other side along the axis AXc of the quadrangular prism shape of the peripheral surface 11s of the core case 11.

In the heat exchange core 10 according to a few embodiments, the communicating hole (not illustrated) that communicates with one end of each of the plurality of second flow paths (not illustrated) is formed on one end face 11c of both end faces of the quadrangular prism shape in the core case 11. The communicating hole (not illustrated) that communicates with the other end of each of the plurality of second flow paths (not illustrated) is formed on another end face 11d of both end faces of the quadrangular prism shape in the core case 11.

In the heat exchanger 1 according to a few embodiments, the ribs 5 include, for example, a first rib 51, a second rib 52, and a third rib 53.

In the heat exchanger 1 according to a few embodiments, the first rib 51 is disposed between the second rib 52 and the third rib 53 respectively disposed on one side and the other side along the axis AXs of the cylinder portion 21.

In the following description, the first rib 51 is also referred to as a central rib 51. The second rib 52 and the third rib 53 are also referred to as end ribs 52 and 53.

In the heat exchanger 1 according to a few embodiments, each of the ribs 5 has a rectangular through hole 5a corresponding to the peripheral surface 11s of the core case 11 in the center of a plate member having a disc shape, such as the third rib 53 illustrated in FIG. 2, except for some ribs described below.

In the heat exchanger 1 illustrated in FIG. 1, the end rib 52 (second rib 52) on the left side of the figure and the end rib 53 (third rib 53) on the right side of the figure are connected to an inner surface 21a of the cylinder portion 21 on the outer circumferential side by full-circle welding, and are connected to the peripheral surface 11s of the core case 11 on the inner circumferential side by full-circle welding.

In the heat exchanger 1 illustrated in FIG. 1, the central rib 51 is sealed against the inner surface 21a of the cylinder portion 21 by an O-ring 91 disposed on an end portion 51a on the outer circumferential side, and is connected to the peripheral surface 11s of the core case 11 on the inner circumferential side by full-circle welding.

Note that in place of the O-ring 91 or together with the O-ring 91, the end portion 51*a* on the outer circumferential side of the central rib 51 and the inner surface 21*a* of the cylinder portion 21 may be sealed by a sealing material such as liquid packing or the like. In the heat exchanger 1 according to a few embodiments, the O-ring 91 and the sealing material such as the liquid packing that seal the end portion 51*a* on the outer circumferential side of the central rib 51 and the inner surface 21*a* of the cylinder portion 21 are collectively referred to as a first sealing member.

In the heat exchanger 1 illustrated in FIG. 1, a fluid flowing in a first header space 71 (described later) and a second header space 72 (described later), the first header space 71 and the second header space 72 being separated by the central rib 51, is the first fluid (water W). Therefore, even if the seal by the first sealing member is incomplete, heterogeneous fluids are not mixed together.

In the heat exchanger 1 illustrated in FIG. 3, an end portion of the end rib 52 in the axis AXs direction on the left side of the figure is connected to the one end face 11*c* of the core case 11 by full-circle welding, and an end portion of the end rib 53 in the axis AXs direction on the right side of the figure is connected to the other end face 11*d* of the core case 11 by full-circle welding. In the heat exchanger 1 illustrated in FIG. 3, the end rib 52 on the left side of the figure and the end rib 53 on the right side of the figure are attached to the inner surface 21*a* of the cylinder portion 21 via an extendable member 81 configured to extend along the axis AXs.

The extendable member 81 is, for example, bellows.

In the heat exchanger 1 illustrated in FIG. 3, the central rib 51 includes an outer circumferential rib 511 connected by full-circle welding to the inner surface 21*a* of the cylinder portion 21 on the outer circumferential side, and an inner circumferential rib 512 connected by full-circle welding to the peripheral surface 11*s* of the core case 11 on the inner circumferential side, the inner circumferential rib 512 being a member other than the outer circumferential rib 511. The outer circumferential rib 511 and the inner circumferential rib 512 are configured to be connected by fastening members such as, for example, bolts 96. Note that the outer circumferential rib 511 and the inner circumferential rib 512 may be connected by fitting the outer circumferential rib 511 and the inner circumferential rib 512 without using fastening members.

In the heat exchanger 1 illustrated in FIG. 4, the end rib 53 on the right side of the figure is connected to the peripheral surface 11*s* of the core case 11 on the inner circumferential side by full-circle welding. In the heat exchanger 1 illustrated in FIG. 4, a protrusion portion 21*b* is formed on the cylinder portion 21 so as to protrude inward in the radial direction at the inner surface 21*a*. In the heat exchanger 1 illustrated in FIG. 4, with regard to the end rib 53 on the right side of the figure, the end face on the right side of the figure abuts against the protrusion portion 21*b* from the left side of the figure. The end rib 53 and the protrusion portion 21*b* on the right side of the figure are configured to be connected by fastening members such as, for example, bolts 97.

In the heat exchanger 1 illustrated in FIG. 4, the central rib 51 is sealed against the inner surface 21*a* of the cylinder portion 21 by the O-ring 91 disposed on the end portion 51*a* on the outer circumferential side, and is connected to the peripheral surface 11*s* of the core case 11 on the inner circumferential side by full-circle welding.

In the heat exchanger 1 illustrated in FIG. 4, the end rib 52 on the left side of the figure is sealed against the inner surface 21*a* of the cylinder portion 21 by the O-ring 91 disposed on an end portion 52*a* on the outer circumferential side, and is connected to the peripheral surface 11*s* of the core case 11 on the inner circumferential side by full-circle welding.

Note that, as described above, in place of the O-ring 91 or together with the O-ring 91, the end portion 51*a* on the outer circumferential side of the central rib 51 and the inner surface 21*a* of the cylinder portion 21 may be sealed by a sealing material such as liquid packing or the like.

In place of the O-ring 91 or together with the O-ring 91, the end portion 52*a* on the outer circumferential side of the end rib 52 and the inner surface 21*a* of the cylinder portion 21 may be sealed by a sealing material such as liquid packing or the like.

In the heat exchanger 1 according to a few embodiments, the O-ring 91 and a sealing material such as the liquid packing that seal the end portion 52*a* on the outer circumferential side of the end rib 52 and the inner surface 21*a* of the cylinder portion 21 are collectively referred to as a second sealing member.

In the heat exchanger 1 according to a few embodiments, in a state where the heat exchange core 10 is disposed inside the shell 20 as illustrated in FIGS. 1, 3, and 4, the first header space 71 is formed in a space between the first rib 51 and the third rib 53 in a space 70 surrounded by the outer surface of the heat exchange core 10 and the inner surface (inner surface 21*a* of the cylinder portion 21) of the shell 20.

In the heat exchanger 1 according to a few embodiments, in a state where the heat exchange core 10 is disposed inside the shell 20 as illustrated in FIGS. 1, 3, and 4, the second header space 72 is formed in a space between the first rib 51 and the second rib 52 in the space 70.

In the heat exchanger 1 according to a few embodiments, the first rib 51 partitions the first header space 71 and the second header space 72. Thus, in the following description, the first rib 51 is also referred to as a first partition wall 51.

In the heat exchanger 1 according to a few embodiments, in a state where the heat exchange core 10 is disposed inside the shell 20 as illustrated in FIGS. 1, 3, and 4, the third header space 73 is formed in a space to the left of the second rib 52 in the figure in the space 70.

In the heat exchanger 1 according to a few embodiments, the second rib 52 partitions the second header space 72 and the third header space 73. Thus, in the following description, the second rib 52 is also referred to as a second partition wall 52.

In the heat exchanger 1 according to a few embodiments, in a state where the heat exchange core 10 is disposed inside the shell 20 as illustrated in FIGS. 1, 3, and 4, the fourth header space 74 is formed in a space to the right of the third rib 53 in the figure in the space 70.

In the heat exchanger 1 according to a few embodiments, the third rib 53 partitions the first header space 71 and the fourth header space 74. Thus, in the following description, the third rib 53 is also referred to as a third partition wall 53.

In the heat exchanger 1 according to a few embodiments, the region 11*a* on one side along the axis AXc of the quadrangular prism shape of the peripheral surface 11*s* of the core case 11 faces the first header space 71. Therefore, the communicating hole (not illustrated) that communicates with one end of each of the plurality of first flow paths (not illustrated) that are formed inside the core case 11 is open to the first header space 71.

In the heat exchanger 1 according to a few embodiments, the region 11*b* on the other side along the axis AXc of the quadrangular prism shape of the peripheral surface 11*s* of the core case 11 faces the second header space 72. Therefore, the communicating hole (not illustrated) that communicates with the other end of each of the plurality of first flow paths (not illustrated) that are formed inside the core case 11 is open to the second header space 72.

In the heat exchanger 1 according to a few embodiments, the one end face 11c of both end faces of the quadrangular prism shape in the core case 11 faces the third header space 73. Therefore, the communicating hole (not illustrated) that communicates with one end of each of the plurality of second flow paths (not illustrated) that are formed inside the core case 11 is open to the third header space 73.

In the heat exchanger 1 according to a few embodiments, the other end face 11d of both end faces of the quadrangular prism shape of the core case 11 faces the fourth header space 74. Therefore, the communicating hole not illustrated that communicates with the other end of each of the plurality of second flow paths (not illustrated) that are formed inside the core case 11 is open to the fourth header space 74.

In the heat exchanger 1 according to a few embodiments, the short tube 31 on the lower side of the figure is connected to the first header space 71 via one of the two communicating holes 25, and the short tube 31 on the upper side of the figure is connected to the second header space 72 via the other of the two communicating holes 25.

Note that a water pipe on the upstream side (not illustrated) is connected to the short tube 31 on the lower side of the figure, and a water pipe on the downstream side (not illustrated) is connected to the short tube 31 on the upper side of the figure.

In the heat exchanger 1 according to a few embodiments, a fuel pipe 35U on the upstream side is connected to the third header space 73 via a plate flange 33 coupled to the flange portion 23 on the left side of the figure.

In the heat exchanger 1 according to a few embodiments, a fuel pipe 35D on the downstream side is connected to the fourth header space 74 via the plate flange 33 coupled to the flange portion 23 on the right side of the figure.

Flow of First Fluid and Second Fluid

In the heat exchanger 1 according to a few embodiments, the first fluid and the second fluid circulate inside the heat exchanger 1 as follows.

Flow of First Fluid

The water W as the first fluid flows into the first header space 71 from the short tube 31 on the lower side of the figure connected to the water pipe on the upstream side (not illustrated).

The water W that has flowed into the first header space 71 flows into the plurality of first flow paths (not illustrated) formed in the core case 11 from a communicating hole (not illustrated) of the core case 11 that is open to the first header space 71, and gives heat to the fuel gas FG flowing through the second flow path in the process of flowing through the first flow path. The water W that has flowed through the first flow path flows into the second header space 72 from a communicating hole (not illustrated) of the core case 11 that is open to the second header space 72.

The water W that has flowed into the second header space 72 flows into the water pipe on the downstream side (not illustrated) via the short tube 31 on the upper side of the figure.

Flow of Second Fluid

The fuel gas FG as the second fluid flows into the third header space 73 from the fuel pipe 35U on the upstream side. The fuel gas FG that has flowed into the third header space 73 flows into the plurality of second flow paths (not illustrated) formed in the core case 11 from a communicating hole (not illustrated) in the core case 11 that is open to the third header space 73, and is heated by the heat from the water W flowing through the first flow path in the process of flowing through the second flow path. The fuel gas FG that has flowed through the second flow path flows into the fourth header space 74 from a communicating hole (not illustrated) of the core case 11 that is open to the fourth header space 74.

The fuel gas FG that has flowed into the fourth header space 74 flows into the fuel pipe 35D on the downstream side from the fourth header space 74.

The heat exchanger 1 according to a few embodiments is provided in the space 70 as described above, and includes the first partition wall 51 for partitioning the space 70 into the first header space 71 communicating with the heat exchange core 10 and the second header space 72 communicating with the heat exchange core 10. In the heat exchanger 1 according to a few embodiments, the first header space 71 and the second header space 72 are adjacent to each other, separated by the first partition wall 51.

Consequently, when the heat exchanger 1 is in use, the space surrounded by the outer surface of the heat exchange core 10, specifically the peripheral surface 11s of the heat exchange core 10, and the inner surface 21a of the shell 20 is filled with the first fluid supplied to the first header space 71 and the second fluid supplied to the second header space 72. Therefore, the pressure of the first fluid supplied to the first header space 71 and the second fluid supplied to the second header space 72 acts on the outer surface of the heat exchange core 10. Therefore, even if the pressure of the fluid that performs heat exchange in the heat exchange core 10 is relatively high, the heat exchange core 10 is less likely to be damaged. The first header space 71 and the second header space 72 can be provided in the space 70 surrounded by the outer surface of the heat exchange core 10 and the inner surface 21a of the shell 20. Therefore, the heat exchanger 1 is made compact more easily. Consequently, the heat exchanger 1 that is relatively compact and that has a relatively high pressure resistance performance can be realized.

In the heat exchanger 1 according to a few embodiments, the heat exchange core 10 preferably has a columnar shape. The first partition wall 51 preferably partitions the space in the space 70 so that the space on one side along the axis AXc having a columnar shape is the first header space 71 and the space on the other side is the second header space 72. The first header space 71 and the second header space 72 are preferably surrounded by an outer surface corresponding to the peripheral surface 11s of the columnar shape.

Consequently, the pressure of the first fluid supplied to the first header space 71 and the second fluid supplied to the second header space 72 acts on the outer surface corresponding to the peripheral surface 11s having a columnar shape in the heat exchange core 10.

The heat exchanger 1 according to a few embodiments may include the first sealing member (e.g., the O-ring 91 or the like) that seals the first header space 71 and the second header space 72.

Consequently, the first header space and the second header space become easy to seal.

In the heat exchanger 1 according to a few embodiments, the first sealing member may be the O-ring 91 that seals the first partition wall 51 and the shell 20.

Consequently, the first header space and the second header space can be easily sealed.

The heat exchanger 1 according to a few embodiments may further include a second partition wall 52 that is provided in the space 70 surrounded by the outer surface of the heat exchange core 10 and the inner surface 21a of the shell 20, and partitions the space 70 into the third header space 73 communicating with the heat exchange core 10 and the first header space 71 or the second header space 72. The first header space 71 or the second header space 72 and the third header space 73 are preferably adjacent to each other, separated by the second partition wall 52.

Consequently, the third header space 73 can be provided in the shell 20, and therefore, the heat exchanger 1 is made compact more easily.

In the heat exchanger 1 according to a few embodiments, the second partition wall 52 and the third partition wall 53 are preferably attached to the inner surface 21a of the shell 20 via the extendable member 81 configured to extend along the axis AXs direction.

Consequently, the difference in thermal expansion between the shell 20 and the heat exchange core 10 can be absorbed by the extendable member 81, and therefore it is possible to reduce thermal stress in the shell 20 and the heat exchange core 10.

By cutting the extendable member 81, removal of the heat exchange core 10 from the shell 20 can be facilitated, and therefore it is possible to reduce the workload for replacing the heat exchange core 10.

The heat exchanger 1 according to a few embodiments preferably includes the second sealing member (e.g., the O-ring 91 or the like) that seals the first header space 71 and the third header space 73.

Consequently, the first header space 71 and the third header space 73 become easy to seal.

In the heat exchanger 1 according to a few embodiments, the second sealing member may be the O-ring 91 that seals the second partition wall 52 and the shell 20.

Consequently, the first header space 71 and the third header space 73 can be easily sealed.

In the heat exchanger 1 according to a few embodiments, the shell 20 preferably has a cylindrical shape, and the heat exchange core 10 preferably has a columnar shape. The heat exchange core 10 is preferably disposed in the shell 20 such that the axis AXc of a columnar shape becomes substantially parallel to the axis AXs of a cylindrical shape. The first partition wall 51 preferably separates the first header space 71 and the second header space 72 into one side and another side along the axis AXs of the cylindrical shape.

Consequently, the structure of the heat exchanger 1 becomes reasonable, and therefore, the heat exchanger 1 is made compact more easily.

Other Features

In the heat exchanger 1 illustrated in FIGS. 1 and 4, for example, at the time of assembly of the heat exchanger 1, in order to prevent the O-ring 91 from unnecessarily rubbing against and damaging the inner surface 21a of the cylinder portion 21 when the heat exchange core 10 with the rib 5 attached is inserted into the cylinder portion 21, the inside diameter of the cylinder portion 21 that becomes the inlet side when the heat exchange core 10 is inserted into the cylinder portion 21 is partially widened. Then, a tapered portion 21c in which the diameter of the inner surface 21a of the cylinder portion 21 gradually changes is provided such that when the heat exchange core 10 is inserted into the cylinder portion 21, the distance between the end portion 51a on the outer circumferential side of the central rib 51 or the end portion 52a on the outer circumferential side of the end rib 52 and the inner surface 21a of the cylinder portion 21 gradually becomes an appropriate distance immediately before the heat exchange core 10 reaches a fixed position in the cylinder portion 21.

Figure 10A:
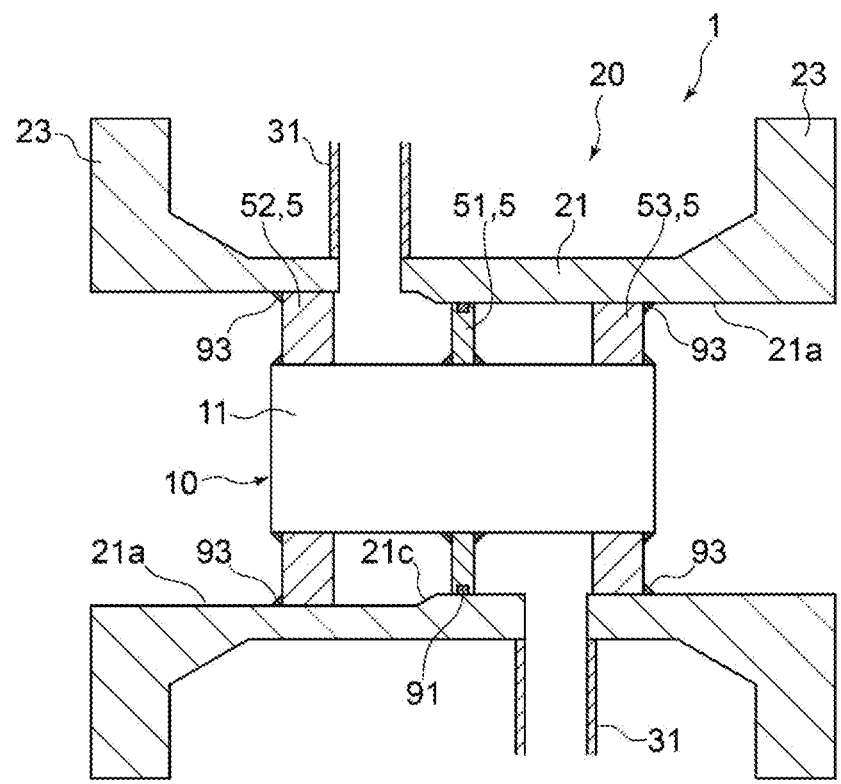
FIG. 10A is a view for describing a replacement method of a heat exchange core of the heat exchanger illustrated in FIG. 1.
Figure 10B:
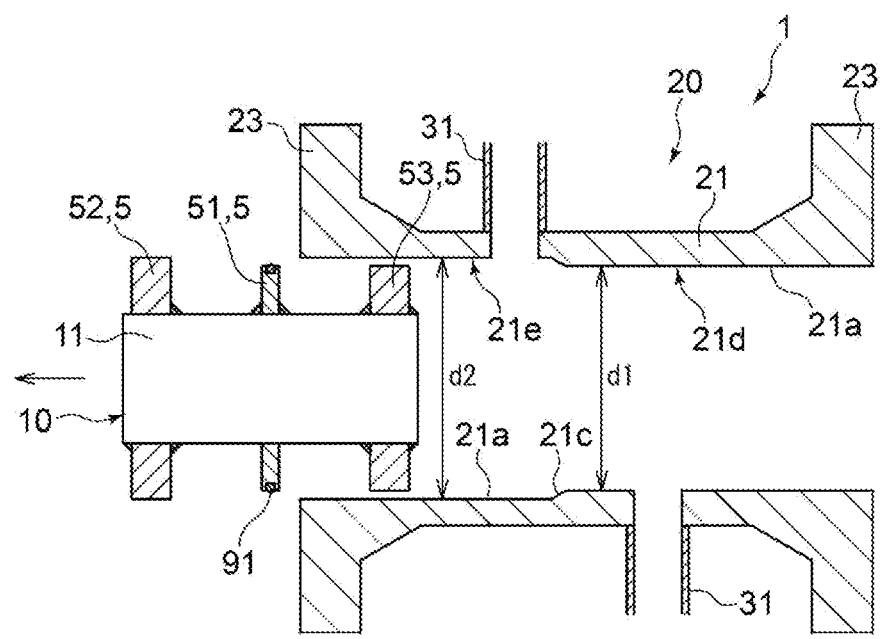
FIG. 10B is a view for describing a replacement method of a heat exchange core of the heat exchanger illustrated in FIG. 1.

In other words, as illustrated in FIG. 10B described later, in the heat exchanger 1 illustrated in FIG. 1, the shell 20 includes a first inside diameter portion 21d having a first inside diameter d1, a second inside diameter portion 21e having a second inside diameter d2 larger than the first inside diameter d1, and the tapered portion 21c in which the inside diameter gradually changes from the first inside diameter d1 to the second inside diameter d2 from the first inside diameter portion 21d toward the second inside diameter portion 21e.

Figure 12A:
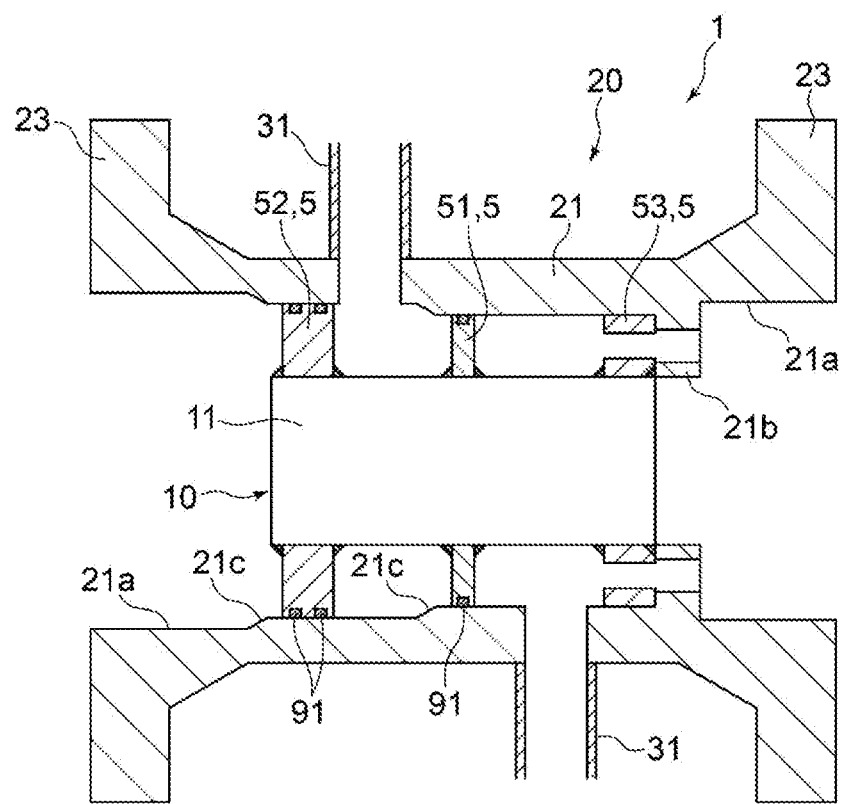
FIG. 12A is a view for describing a replacement method of a heat exchange core of the heat exchanger illustrated in FIG. 4.
Figure 12B:
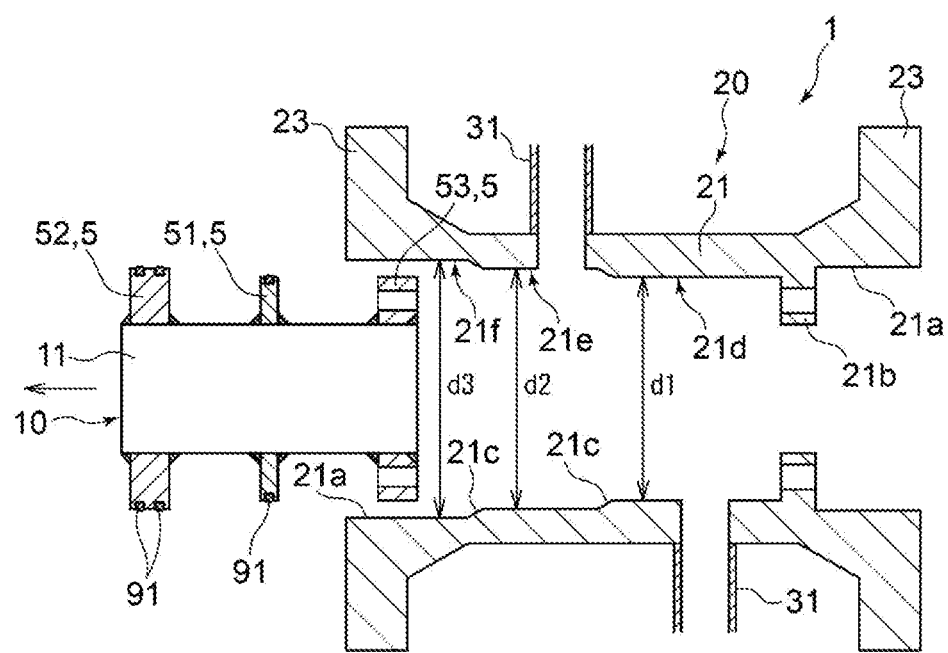
FIG. 12B is a view for describing a replacement method of a heat exchange core of the heat exchanger illustrated in FIG. 4.

Similarly, as illustrated in FIG. 12B described later, in the heat exchanger 1 illustrated in FIG. 4, the shell 20 includes the first inside diameter portion 21d having the first inside diameter d1, the second inside diameter portion 21e having the second inside diameter d2 larger than the first inside diameter d1, and the tapered portion 21c in which the inside diameter gradually changes from the first inside diameter d1 to the second inside diameter d2 from the first inside diameter portion 21d toward the second inside diameter portion 21e.

In the heat exchanger 1 illustrated in FIG. 4, as illustrated in FIG. 12B, the shell 20 includes a third inside diameter portion 21f having a third inside diameter d3 larger than the second inside diameter d2, and the tapered portion 21c in which the inside diameter gradually changes from the second inside diameter d2 to the third inside diameter d3 from the second inside diameter portion 21e toward the third inside diameter portion 21f.

Consequently, at the time of assembly of the heat exchanger 1, it is possible to suppress the O-ring 91 from undesirably rubbing against and damaging the inner surface 21a of the cylinder portion 21 when the heat exchange core 10 attached with the ribs 5 is inserted into the cylinder portion 21.

In the heat exchanger 1 according to a few embodiments, the flange portion 23 is provided on both ends of the cylinder portion 21, and a flange portion is formed also on an end portion of the short tube 31. Consequently, attachment and detachment of the heat exchanger 1 are facilitated.

In removing the heat exchanger 1 attached to the fuel pipes 35U and 35D, the flange portion 23 and the plate flange 33 may be unfastened, and the flanges of the fuel pipes 35U and 35D and the plate flange 33 may be unfastened.

In the heat exchanger 1 illustrated in FIG. 4, the position where the heat exchange core 10 is restrained from moving in the axis AXs direction with respect to the cylinder portion 21 is only the end rib 53 (on the right side of the figure) fixed to the protrusion portion 21b by fastening members such as the bolts 97. That is, in the heat exchanger 1 illustrated in FIG. 4, one end along the axis AXs direction of the heat exchange core 10 is a fixed end, but the other end is a free end. Therefore, the difference in thermal expansion between the shell 20 and the heat exchange core 10 can be absorbed by the movement of the free end, and therefore it is possible to reduce thermal stress in the shell 20 and the heat exchange core 10.

Further, in the heat exchanger 1 illustrated in FIG. 4, the heat exchange core 10 can be easily removed from the shell 20 by uncoupling the heat exchange core 10 from the protrusion portion 21b by fastening members such as the bolts 97.

Method of Increasing Heat Transfer Amount

Figure 5:
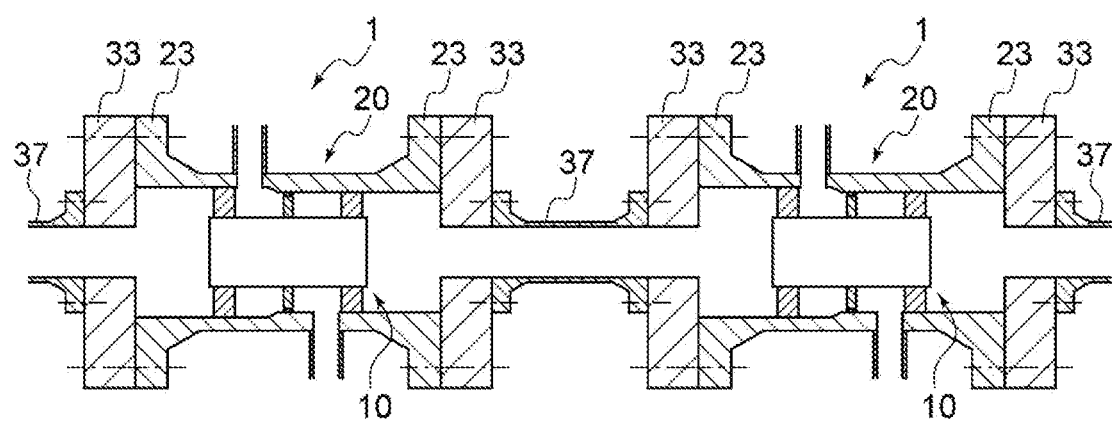
FIG. 5 is a view illustrating an example of series connection of a heat exchanger according to a few embodiments.

FIG. 5 is a view illustrating an example of series connection of the heat exchanger 1 according to a few embodiments.

Figure 6:
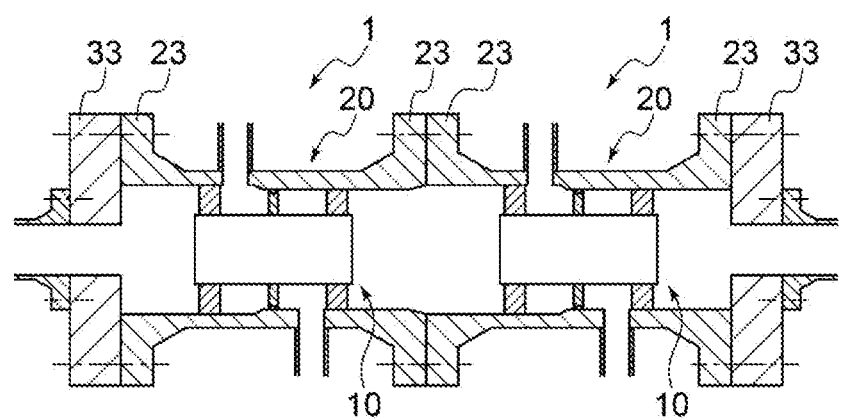
FIG. 6 is a view illustrating another example of series connection of a heat exchanger according to a few embodiments.

FIG. 6 is a view illustrating another example of series connection of the heat exchanger 1 according to a few embodiments.

Figure 7:
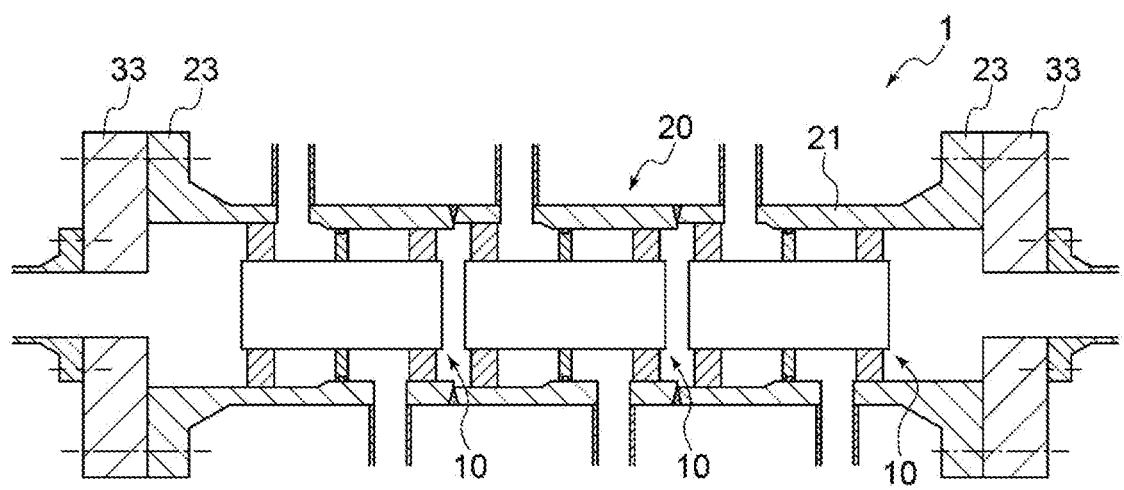
FIG. 7 is a view illustrating an example of a modification example of a heat exchanger according to a few embodiments.

FIG. 7 is a view illustrating an example of a modification example of the heat exchanger 1 according to a few embodiments.

In the heat exchanger 1 according to a few embodiments, as illustrated in FIG. 5, the plurality of heat exchangers 1 can be connected in series by connecting the end portions of the cylinder portion 21 to each other via short tubes 37.

As illustrated in FIG. 6, the plurality of heat exchangers 1 may be connected in series by directly coupling the flange portions 23 to each other not via the short tubes 37.

Any of the heat exchangers 1 illustrated in FIGS. 1, 3, and 4 can connect the plurality of heat exchangers 1 in series as illustrated in FIGS. 5 and 6.

Note that as illustrated in FIG. 7, a plurality of heat exchange cores 10 may be disposed along the axis AXs direction inside the cylinder portion 21. The plurality of heat exchangers 1 illustrated in FIG. 7 may be connected in series as illustrated in FIGS. 5 and 6.

Use in Combination with Existing Heat Exchanger)

Figure 8:
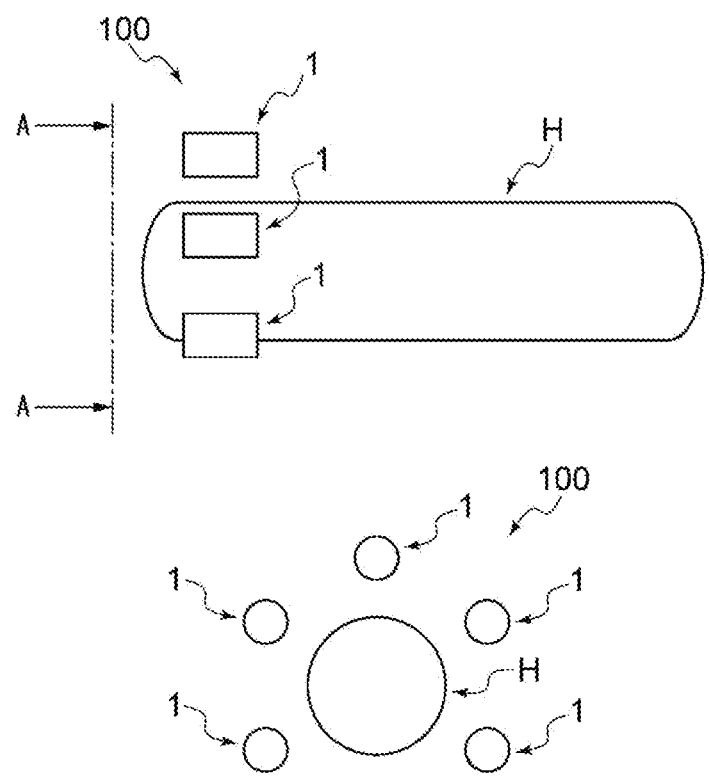
FIG. 8 is a schematic view for describing an example of a case in which a heat exchanger according to a few embodiments is used in combination with an existing heat exchanger.

FIG. 8 is a schematic view for describing an example of a case in which the heat exchanger 1 according to a few embodiments is used in combination with an existing heat exchanger.

Figure 9:
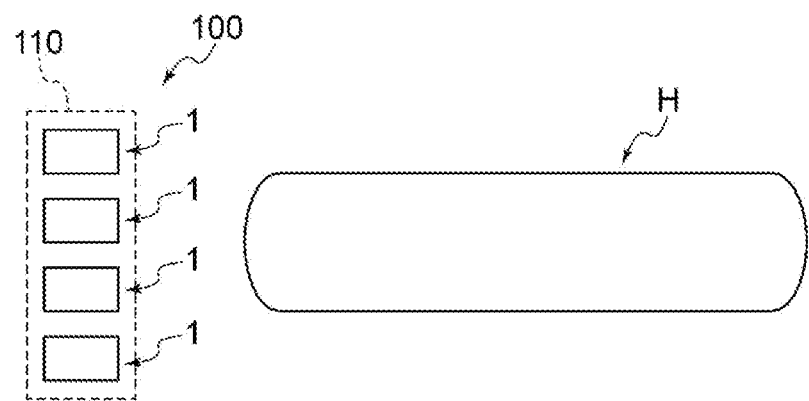
FIG. 9 is a schematic view for describing another example of a case in which a heat exchanger according to a few embodiments is used in combination with an existing heat exchanger.

FIG. 9 is a schematic view for describing another example of a case in which the heat exchanger 1 according to a few embodiments is used in combination with an existing heat exchanger.

In the heat exchanger 1 according to a few embodiments, as illustrated in FIG. 8 for example, in a case where an existing heat exchanger H is, for example, a shell and tube type heat exchanger that is relatively large in volume, the heat exchanger 1 can be disposed to surround the periphery of the existing heat exchanger H.

In the example illustrated in FIG. 8, for example, a heat exchanger group 100 including a plurality of heat exchangers 1 connected in parallel may be connected to the existing heat exchanger H, for example, in series.

In the heat exchanger 1 according to a few embodiments, as illustrated in FIG. 9 for example, in a case where the existing heat exchanger H is, for example, a shell and tube type heat exchanger that is relatively large in volume, the heat exchanger group 100 installed collectively in a frame 110 or the like can be disposed in the vicinity of the existing heat exchanger H.

In the example illustrated in FIG. 9, for example, a heat exchanger group 100 including a plurality of heat exchangers 1 connected in parallel may be connected to the existing heat exchanger H, for example, in series.

Replacement Method of Heat Exchange Core

FIGS. 10A and 10B are views for describing a replacement method of the heat exchange core 10 of the heat exchanger 1 illustrated in FIG. 1.

Figure 11A:
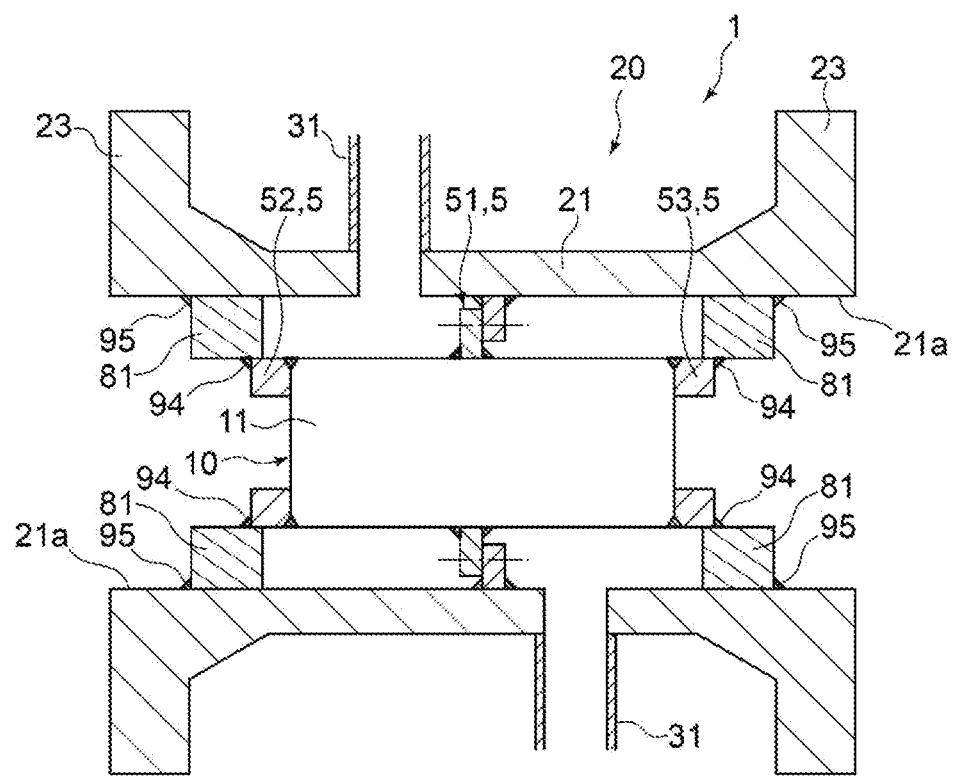
FIG. 11A is a view for describing a replacement method of a heat exchange core of the heat exchanger illustrated in FIG. 3.
Figure 11B:
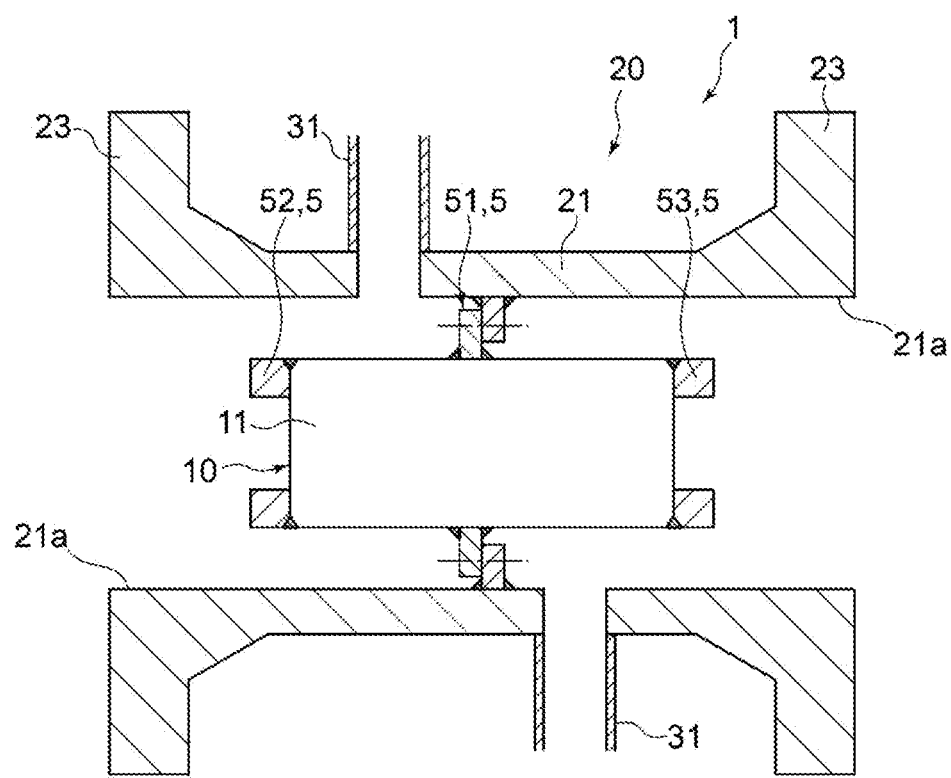
FIG. 11B is a view for describing a replacement method of a heat exchange core of the heat exchanger illustrated in FIG. 3.
Figure 11C:
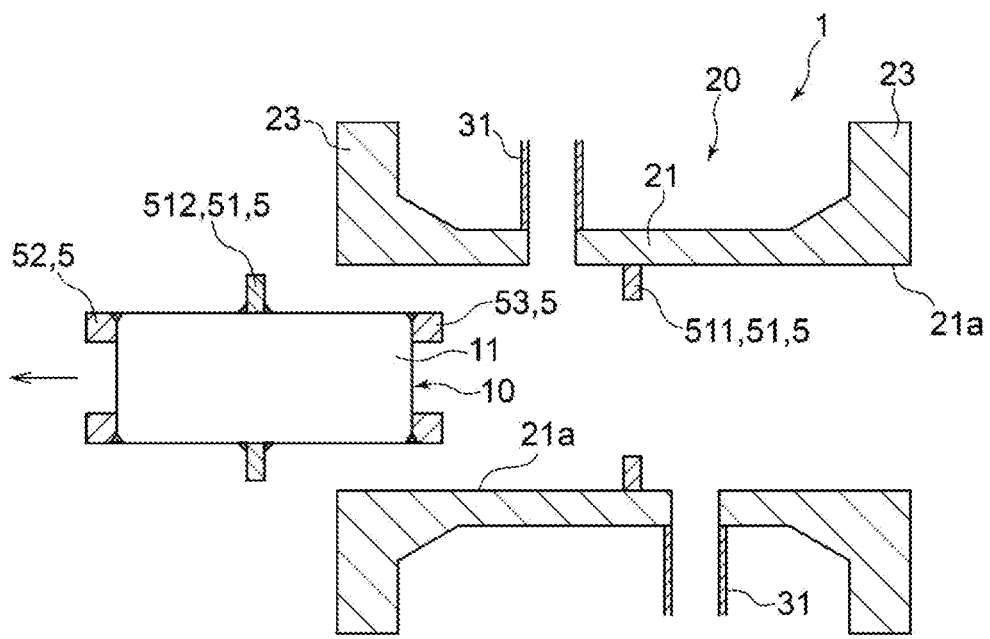
FIG. 11C is a view for describing a replacement method of a heat exchange core of the heat exchanger illustrated in FIG. 3.

FIGS. 11A to 11C are views for describing a replacement method of the heat exchange core 10 of the heat exchanger 1 illustrated in FIG. 3.

FIGS. 12A and 12B are views for describing a replacement method of the heat exchange core 10 of the heat exchanger 1 illustrated in FIG. 4.

Figure 13:
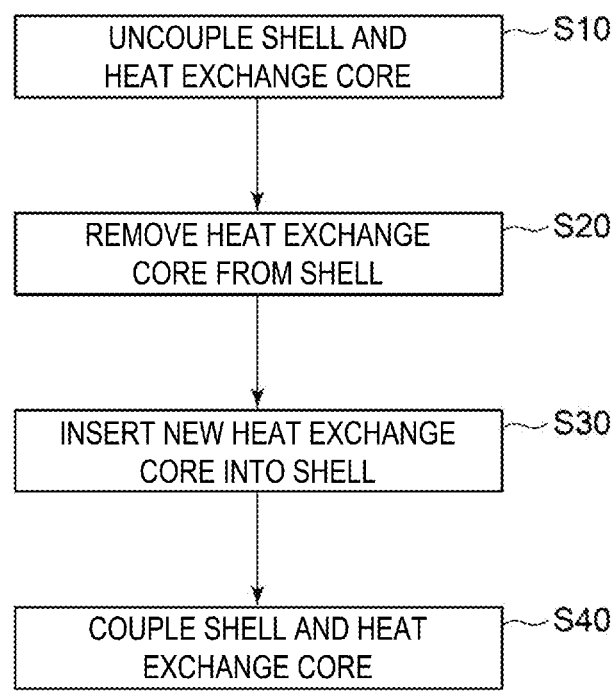
FIG. 13 is a flowchart of a replacement method of a heat exchange core according to a few embodiments.

FIG. 13 is a flowchart of a replacement method of a heat exchange core according to a few embodiments.

A replacement method of a heat exchange core according to a few embodiments includes a step S10 of uncoupling the shell 20 and the heat exchange core 10 of the heat exchanger 1, and a step S20 of moving at least the heat exchange core 10 from the shell 20 in the axial direction of the shell 20 to remove the heat exchange core 10 from the shell 20. The replacement method of a heat exchange core according to a few embodiments includes a step S30 of inserting a new heat exchange core 10 into the shell 20 and a step S40 of coupling the shell 20 and the new heat exchange core 10.

A procedure of removing the heat exchange core 10 from the shell 20 will be described below.

When replacing the heat exchange core 10 of the heat exchanger 1 according to a few embodiments, the heat exchanger 1 attached to the fuel pipes 35U and 35D is removed in advance, and the flange portion 23 and the plate flange 33 are unfastened, so that the flange portion 23 is opened as illustrated in FIGS. 10A, 11A, and 12A. Note that, as illustrated in FIGS. 5 and 6, when a plurality of heat exchangers 1 are connected in series, they are separated into individual heat exchangers 1.

Step S10 of Uncoupling Shell 20 and Heat Exchange Core 10

In the replacement method of a heat exchange core according to a few embodiments, the step S10 of uncoupling the shell 20 and the heat exchange core 10 is a step of uncoupling the shell 20 and the heat exchange core 10 that are coupled via each of the ribs 51, 52, and 53.

For example, in the case of the heat exchanger 1 illustrated in FIG. 1, full-circle welding portions 93 of the end rib 52 on the left side of the figure and the end rib 53 on the right side of the figure and the inner surface 21a of the shell 20 are scraped off using, for example, a grinder or the like illustrated in FIG. 10A, and the end ribs 52 and 53 and the shell 20 are uncoupled.

Consequently, in the heat exchanger 1 illustrated in FIG. 1, the shell 20 and the heat exchange core 10 are uncoupled.

For example, in the case of the heat exchanger 1 illustrated in FIG. 3, the end ribs 52 and 53 and the shell 20 are uncoupled (see FIG. 11B) by cutting the extendable members 81 illustrated in FIG. 11A, and scraping off using, for example, a grinder or the like, full-circle welding portions 95 between the extendable members 81 and the inner surface 21a of the shell 20 and full-circle welding portions 94 between the end rib 52 on the left side of the figure and the end rib 53 on the right side of the figure and the extendable members 81.

Then, the fastening members (see FIG. 3) such as the bolts 96 that fasten the outer circumferential rib 511 and the inner circumferential rib 512 in the central rib 51 are removed.

Consequently, in the heat exchanger 1 illustrated in FIG. 3, the shell 20 and the heat exchange core 10 are uncoupled.

For example, in the case of the heat exchanger 1 illustrated in FIG. 4, the fastening members (see FIG. 4) such as the bolts 97 that fasten the end rib 53 and the protrusion portion 21b on the right side of the figure as illustrated in FIG. 12A are removed.

Consequently, in the heat exchanger 1 illustrated in FIG. 4, the shell 20 and the heat exchange core 10 are uncoupled.

Step S20 of Removing Heat Exchange Core 10 from Shell 20

In the replacement method of a heat exchange core according to a few embodiments, the step S20 of removing the heat exchange core 10 from the shell 20 is a step of removing, from the shell 20, the heat exchange core 10 where the shell 20 has been uncoupled by carrying out the step S10 of uncoupling the shell 20 and the heat exchange core 10.

For example, in the case of the heat exchanger 1 illustrated in FIG. 1, as illustrated in FIG. 10B, the heat exchange core 10 attached with the ribs 51, 52, and 53 is moved to, for example, the left side of the figure together with each of the ribs 51, 52, and 53 in order to be removed from the shell 20.

For example, in the case of the heat exchanger 1 illustrated in FIG. 3, as illustrated in FIG. 11C, the heat exchange core 10 attached with the inner circumferential rib 512 and the end ribs 52 and 53 is moved to, for example, the left side of the figure together with each of the ribs 512, 52, and 53 in order to be removed from the shell 20.

For example, in the case of the heat exchanger 1 illustrated in FIG. 4, as illustrated in FIG. 12B, the heat exchange core 10 attached with the ribs 51, 52, and 53 is moved to, for example, the left side of the figure together with each of the ribs 51, 52, and 53 in order to be removed from the shell 20.

The procedure for attaching a new heat exchange core 10 to the shell 20 is approximately an inverse procedure of the above-described procedure of removing the heat exchange core 10 from the shell 20. The procedure for attaching the new heat exchange core 10 to the shell 20 will be described below.

Step S30 of Inserting New Heat Exchange Core 10 into Shell 20)

In the replacement method of a heat exchange core according to a few embodiments, the step S30 of inserting the new heat exchange core 10 into the shell 20 is a step of moving the new heat exchange core 10 in the axial direction with respect to the shell 20 from which the heat exchange core 10 has been removed, and inserting the new heat exchange core 10 into the shell 20.

For example, in the case of the heat exchanger 1 illustrated in FIG. 1, opposite to the case of removal of the heat exchange core 10 illustrated in FIG. 10B, the new heat exchange core 10 attached with each of the ribs 51, 52, and 53 is inserted into the shell 20 from, for example, the left side of the figure. Note that when the O-ring 91 seals between the central rib 51 and the inner surface 21a of the cylinder portion 21, the O-ring 91 is preferably disposed in advance in the end portion 51a on the outer circumferential side of the central rib 51.

When the new heat exchange core 10 is inserted into the shell 20 from an opening end on the left side of the figure to move the new heat exchange core 10 in the shell 20 to the right side of the figure, the O-ring 91 moves from the second inside diameter portion 21e to the first inside diameter portion 21d through the tapered portion 21c. Consequently, it is possible to suppress the O-ring 91 from undesirably rubbing against and damaging the inner surface 21a of the cylinder portion 21.

For example, in the case of the heat exchanger 1 illustrated in FIG. 3, opposite to the case of removal of the heat exchange core 10 illustrated in FIG. 11C, the new heat exchange core 10 attached with the inner circumferential rib 512 and the end ribs 52 and 53 is inserted into the shell 20 from, for example, the left side of the figure.

For example, in the case of the heat exchanger 1 illustrated in FIG. 4, opposite to the case of removal of the heat exchange core 10 illustrated in FIG. 12B, the new heat exchange core 10 attached with each of the ribs 51, 52, and 53 is inserted into the shell 20 from, for example, the left side of the figure. Note that when the O-ring 91 seals between the central rib 51 or the end rib 52 on the left side of the figure and the inner surface 21a of the cylinder portion 21, the O-ring 91 is preferably disposed in advance in the end portion 51a on the outer circumferential side of the central rib 51 and the end portion 52a on the outer circumferential side of the end rib 52.

When the new heat exchange core 10 is inserted into the shell 20 from an opening end on the left side of the figure to move the new heat exchange core 10 in the shell 20 to the right side of the figure, the O-ring 91 disposed in the central rib 51 moves from the second inside diameter portion 21e to the first inside diameter portion 21d through the tapered portion 21c, and the O-ring 91 disposed in the end rib 52 moves from the third inside diameter portion 21f to the second inside diameter portion 21e through the tapered portion 21c. Consequently, it is possible to suppress the O-ring 91 from undesirably rubbing against and damaging the inner surface 21a of the cylinder portion 21.

Step S40 of Coupling Between Shell 20 and New Heat Exchange Core 10)

In the replacement method of a heat exchange core according to a few embodiments, the step S40 of coupling the shell 20 and the new heat exchange core 10 is a step of coupling the new heat exchange core 10 inserted into the shell 20 with the shell 20.

For example, in the case of the heat exchanger 1 illustrated in FIG. 1, as illustrated in FIG. 10A, the end rib 52 on the left side of the figure and the end rib 53 on the right side of the figure and the inner surface 21a of the shell 20 are full-circle welded.

Consequently, in the heat exchanger 1 illustrated in FIG. 1, the shell 20 and the heat exchange core 10 are coupled together.

For example, in the case of the heat exchanger 1 illustrated in FIG. 3, as illustrated in FIG. 11B, the outer circumferential rib 511 and the inner circumferential rib 512 are fastened in the central rib 51 with fastening members such as the bolts 96 (see FIG. 3).

Then, as illustrated in FIG. 11A, the extendable member 81 is inserted into the shell 20 from both ends of the shell 20, and the extendable member 81 and the inner surface 21a of the shell 20 are full-circle welded, and the end rib 52 on the left side of the figure and the end rib 53 on the right side of the figure and the extendable member 81 are full-circle welded.

Consequently, in the heat exchanger 1 illustrated in FIG. 3, the shell 20 and the heat exchange core 10 are coupled together.

For example, in the case of the heat exchanger 1 illustrated in FIG. 4, the end face (on the right side of the figure) of the end rib 53 (on the right side of the figure) is abutted against the protrusion portion 21b from the left side of the figure as illustrated in FIG. 12A, and the end rib 53 and the protrusion portion 21b (on the right side of the figure) are fastened by fastening members (see FIG. 4) such as the bolts 97.

Consequently, in the heat exchanger 1 illustrated in FIG. 4, the shell 20 and the heat exchange core 10 are coupled together.

In the above, the replacement of the heat exchange core 10 is completed. The heat exchanger 1 for which the replacement of the heat exchange core 10 has been completed can be connected in series or attached to the fuel pipes 35U and 35D as appropriate.

The present disclosure is not limited to the above-described embodiments, and includes embodiments obtained by modifying the above-described embodiments and embodiments obtained by appropriately combining these embodiments.

The contents described in each of the above embodiments are understood as follows, for example.

(1) The heat exchanger 1 according to at least one embodiment of the present disclosure includes the heat exchange core 10, the shell 20 provided to surround the heat exchange core 10, and the first partition wall 51 that is provided in the space 70 surrounded by the outer surface of the heat exchange core 10 and the inner surface (inner surface 21a of the cylinder portion 21) of the shell 20 and that partitions the space 70 into the first header space 71 communicating with the heat exchange core 10 and the second header space 72 communicating with the heat exchange core 10. In the heat exchanger 1 according to at least one embodiment of the present disclosure, the first header space 71 and the second header space 72 are adjacent to each other, separated by the first partition wall 51.

According to the configuration of (1) described above, even if the pressure of the fluid that performs heat exchange in the heat exchange core 10 is relatively high, the heat exchange core 10 is less likely to be damaged. The first header space 71 and the second header space 72 can be provided in the space 70, and therefore, the heat exchanger 1 is made compact more easily. Consequently, the heat exchanger 1 that is relatively compact and that has a relatively high pressure resistance performance can be realized.

(2) In a few embodiments, in the configuration of (1) described above, the heat exchange core 10 preferably has a columnar shape. The first partition wall 51 preferably partitions the space in the space 70 such that the space on one side along the axis AXc having a columnar shape is the first header space 71 and the space on the other side is the second header space 72. The first header space 71 and the second header space 72 are preferably surrounded by an outer surface corresponding to the peripheral surface 11s of the columnar shape.

According to the configuration of (2) described above, the pressure of the fluid supplied to the first header space 71 and the fluid supplied to the second header space 72 can be applied to the outer surface corresponding to the peripheral surface 11s having a columnar shape of the heat exchange core 10.

(3) In a few embodiments, the configuration of (1) or (2) described above preferably includes the first sealing member (e.g., the O-ring 91 or the like) that seals the first header space 71 and the second header space 72.

According to the configuration of (3) described above, the first header space 71 and the second header space 72 become easy to seal.

(4) In a few embodiments, in the configuration of (3) described above, the first sealing member may be the O-ring 91 that seals the first partition wall 51 and the shell 20.

According to the configuration of (4) described above, the first header space 71 and the second header space 72 can be easily sealed.

(5) In a few embodiments, the configuration of any of (1) to (4) described above may further include a second partition wall 52 that is provided in the space 70 surrounded by the outer surface of the heat exchange core 10 and the inner surface 21a of the shell 20, and partitions the space 70 into the third header space 73 communicating with the heat exchange core 10 and the first header space 71 or the second header space 72. The first header space 71 or the second header space 72 and the third header space 73 are preferably adjacent to each other, separated by the second partition wall 52.

According to the configuration of (5) described above, the third header space 73 can be provided in the shell 20, and therefore, the heat exchanger 1 is made compact more easily.

(6) In a few embodiments, in the configuration of (5) described above, the second partition wall 52 is preferably attached to the inner surface 21a of the shell 20 via the extendable member 81 configured to extend along the axial direction (axis AXs direction) of the shell 20.

According to the configuration of (6) described above, the difference in thermal expansion between the shell 20 and the heat exchange core 10 can be absorbed by the extendable member 81, and therefore it is possible to reduce thermal stress in the shell 20 and the heat exchange core 10.

(7) In a few embodiments, the configuration of (5) described above preferably includes the second sealing member (e.g., the O-ring 91 or the like) that seals the first header space 71 and the third header space 73.

According to the configuration of (7) described above, the first header space 71 and the third header space 73 become easy to seal.

(8) In a few embodiments, in the configuration of (7) described above, the second sealing member may be the O-ring 91 that seals the second partition wall 52 and the shell 20.

According to the configuration of (8) described above, the first header space 71 and the third header space 73 can be easily sealed.

(9) In a few embodiments, in any of the configurations (1) to (8) described above, the shell 20 preferably has a cylindrical shape, and the heat exchange core 10 preferably has a columnar shape. The heat exchange core 10 is preferably disposed in the shell 20 such that the axis AXc of a columnar shape becomes substantially parallel to the axis AXs of a cylindrical shape. The first partition wall 51 preferably separates the first header space 71 and the second header space 72 into one side and another side along the axis AXs of the cylindrical shape.

According to the configuration of (9) described above, the structure of the heat exchanger 1 becomes reasonable, and therefore, the heat exchanger 1 is made compact more easily.

(10) In a few embodiments, in the configuration of (9) described above, the shell 20 preferably includes the first inside diameter portion 21d having the first inside diameter d1, the second inside diameter portion 21e having the second inside diameter d2 larger than the first inside diameter d1, and the tapered portion 21c having an inside diameter that gradually changes from the first inside diameter d1 to the second inside diameter d2 from the first inside diameter portion 21d toward the second inside diameter portion 21e.

According to the configuration of (10) described above, at the time of assembly of the heat exchanger 1, when the heat exchange core 10 attached with the ribs 5 is inserted into the cylinder portion 21, it is possible to suppress the first sealing member (e.g., the O-ring 91 or the like) from undesirably rubbing against and damaging the inner surface 21a of the cylinder portion 21.

(11) In a few embodiments, in the configuration of (9) or (10) described above, a plurality of heat exchange cores 10 may be disposed along the axis AXs of the cylindrical shape in the shell 20.

According to the configuration of (11) described above, a heat transfer amount in the heat exchanger 1 can be easily increased. Compared with a case of preparing a plurality of heat exchangers 1 including one heat exchange core 10, the space occupied by the heat exchanger 1 can be reduced.

(12) The replacement method of a heat exchange core according to at least one embodiment of the present disclosure includes the step S10 of uncoupling the shell 20 and the heat exchange core 10 of the heat exchanger 1 in any of the configurations (1) to (11) described above, and the step S20 of moving at least the heat exchange core 10 from the shell 20 in the axial direction of the shell 20 to remove the heat exchange core 10 from the shell 20. The replacement method of a heat exchange core according to at least one embodiment of the present disclosure includes the step S30 of moving the new heat exchange core 10 in the axial direction with respect to the shell 20 from which the heat exchange core 10 has been removed, and inserting the new heat exchange core 10 into the shell 20, and the step S40 of coupling the shell 20 and the new heat exchange core 10.

According to the method of (12) described above, the heat exchange core 10 in the heat exchanger 1 can be replaced relatively easily.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A heat exchanger comprising:
a heat exchange core;
a shell provided to surround the heat exchange core; and
a first partition wall that is provided in a space surrounded by an outer surface of the heat exchange core and an inner surface of the shell, and partitions the space into a first header space communicating with the heat exchange core and a second header space communicating with the heat exchange core, wherein:
the first header space and the second header space are adjacent to each other, separated by the first partition wall;
the heat exchange core has a columnar shape;
the first partition wall partitions the space such that the space on one side along an axis of the columnar shape is the first header space and the space on another side is the second header space in the space; and
the first header space and the second header space are surrounded by the outer surface corresponding to a peripheral surface of the columnar shape.

2. The heat exchanger according to claim 1, further comprising:
a first sealing member that seals the first header space and the second header space.

3. The heat exchanger according to claim 2, wherein the first sealing member is an O-ring that seals the first partition wall and the shell.

4. The heat exchanger according to claim 1, further comprising:
a second partition wall that is provided in the space surrounded by an outer surface of the heat exchange core and an inner surface of the shell, and partitions the space into a third header space communicating with the heat exchange core and the first header space or the second header space, wherein
the first header space or the second header space and the third header space are adjacent to each other, separated by the second partition wall.

5. The heat exchanger according to claim 4, further comprising:
a second sealing member that seals the first header space and the third header space.

6. The heat exchanger according to claim 5, wherein the second sealing member is an O-ring that seals the second partition wall and the shell.

7. A replacement method of a heat exchange core comprising steps of:
uncoupling the shell and the heat exchange core of the heat exchanger according to claim 1;
moving at least the heat exchange core from the shell in an axial direction of the shell to remove the heat exchange core from the shell;
moving a new heat exchange core in the axial direction with respect to the shell from which the heat exchange core has been removed, and inserting the new heat exchange core into the shell; and
coupling the shell and the new heat exchange core.

8. A heat exchanger comprising:
a heat exchange core;
a shell provided to surround the heat exchange core;
a first partition wall that is provided in a space surrounded by an outer surface of the heat exchange core and an inner surface of the shell, and partitions the space into a first header space communicating with the heat exchange core and a second header space communicating with the heat exchange core; and
a second partition wall that is provided in the space surrounded by an outer surface of the heat exchange core and an inner surface of the shell, and partitions the space into a third header space communicating with the heat exchange core and the first header space or the second header space, wherein:
the first header space or the second header space and the third header space are adjacent to each other, separated by the second partition wall; and
the second partition wall is attached to the inner surface of the shell via an extendable member configured to extend along the axial direction of the shell.

9. The heat exchanger according to claim 8, wherein the heat exchange core has a columnar shape,
the first partition wall partitions the space such that the space on one side along an axis of the columnar shape is the first header space and the space on another side is the second header space in the space, and
the first header space and the second header space are surrounded by the outer surface corresponding to a peripheral surface of the columnar shape.

10. The heat exchanger according to claim 8, further comprising:
a second sealing member that seals the first header space and the third header space.

11. A replacement method of a heat exchange core comprising steps of:
uncoupling the shell and the heat exchange core of the heat exchanger according to claim 8;
moving at least the heat exchange core from the shell in an axial direction of the shell to remove the heat exchange core from the shell;
moving a new heat exchange core in the axial direction with respect to the shell from which the heat exchange core has been removed, and inserting the new heat exchange core into the shell; and
coupling the shell and the new heat exchange core.

12. A heat exchanger comprising:
a heat exchange core;
a shell provided to surround the heat exchange core; and
a first partition wall that is provided in a space surrounded by an outer surface of the heat exchange core and an inner surface of the shell, and partitions the space into a first header space communicating with the heat exchange core and a second header space communicating with the heat exchange core, wherein:
the first header space and the second header space are adjacent to each other, separated by the first partition wall;
the shell has a cylindrical shape;

the heat exchange core has a columnar shape;
the heat exchange core is disposed in the shell such that an axis of the columnar shape becomes substantially parallel to an axis of the cylindrical shape; and
the first partition wall separates the first header space and the second header space into one side and another side along an axis of the cylindrical shape.

13. The heat exchanger according to claim 12, wherein the shell includes
a first inside diameter portion having a first inside diameter,
a second inside diameter portion having a second inside diameter larger than the first inside diameter, and
a tapered portion having an inside diameter that gradually changes from the first inside diameter to the second inside diameter from the first inside diameter portion toward the second inside diameter portion.

14. The heat exchanger according to claim 12, wherein a plurality of the heat exchange cores are disposed along an axis of the cylindrical shape in the shell.

15. The heat exchanger according to claim 12, wherein:
the heat exchange core has a columnar shape;
the first partition wall partitions the space such that the space on one side along an axis of the columnar shape is the first header space and the space on another side is the second header space in the space; and
the first header space and the second header space are surrounded by the outer surface corresponding to a peripheral surface of the columnar shape.

16. The heat exchanger according to claim 15, wherein the second sealing member is an O-ring that seals the second partition wall and the shell.

17. A replacement method of a heat exchange core comprising steps of:
uncoupling the shell and the heat exchange core of the heat exchanger according to claim 12;
moving at least the heat exchange core from the shell in an axial direction of the shell to remove the heat exchange core from the shell;
moving a new heat exchange core in the axial direction with respect to the shell from which the heat exchange core has been removed, and inserting the new heat exchange core into the shell; and
coupling the shell and the new heat exchange core.

* * * * *